US011877094B2

United States Patent
Okuda et al.

(10) Patent No.: US 11,877,094 B2
(45) Date of Patent: Jan. 16, 2024

(54) MONITORING SYSTEM, MONITORING METHOD, AND MONITORING PROGRAM

(71) Applicant: NEC CORPORATION, Tokyo (JP)

(72) Inventors: Yoshifumi Okuda, Tokyo (JP); Tatsushi Yasuda, Tokyo (JP); Kenichiro Ida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/921,409

(22) Filed: Jul. 6, 2020

(65) Prior Publication Data
US 2020/0336704 A1 Oct. 22, 2020

Related U.S. Application Data

(63) Continuation of application No. 16/687,048, filed on Nov. 18, 2019, now Pat. No. 10,750,127, which is a
(Continued)

(51) Int. Cl.
*G06K 9/00* (2022.01)
*H04N 7/18* (2006.01)
(Continued)

(52) U.S. Cl.
CPC ............... *H04N 7/18* (2013.01); *G01P 3/38* (2013.01); *G06T 7/20* (2013.01); *G06T 7/246* (2017.01);
(Continued)

(58) Field of Classification Search
CPC .......... G06F 3/147; G06F 3/005; G06F 3/012; G06F 3/013; G06F 3/017; G06F 3/1423;
(Continued)

(56) References Cited

U.S. PATENT DOCUMENTS 8,045,757 B2 10/2011 Tsunashima
8,305,236 B2 11/2012 Mori
(Continued)

FOREIGN PATENT DOCUMENTS

JP H10-257482 9/1998
JP 2007074326 A 3/2007
(Continued)

OTHER PUBLICATIONS

Japanese Office Action for JP Application No. 2020-131690 dated Aug. 4, 2021 with English Translation.
(Continued)

*Primary Examiner* — Alex Kok S Liew
(74) *Attorney, Agent, or Firm* — Sughrue Mion, PLLC

(57) ABSTRACT

An abnormality behind a shielding object is discovered. There is provided a monitoring system including a video acquirer, a detector, and a notifier. The video acquirer of the monitoring system acquires a video. The detector of the monitoring system detects entering of a target object into a blind spot generated by a shielding object in the video and appearance of the target object from the blind spot. If the target object does not appear from the blind spot even after a first time elapses since entering of the target object into the blind spot, the notifier of the monitoring system makes a notification.

9 Claims, 17 Drawing Sheets

Related U.S. Application Data continuation of application No. 16/352,011, filed on Mar. 13, 2019, now Pat. No. 10,516,855, which is a continuation of application No. 15/559,526, filed as application No. PCT/JP2015/083912 on Dec. 2, 2015, now Pat. No. 10,368,035.

(51) Int. Cl.

| | | |
|---|---|---|
| *G08B 13/196* | (2006.01) | |
| *G06T 7/246* | (2017.01) | |
| *G06T 7/20* | (2017.01) | |
| *G01P 3/38* | (2006.01) | |

(52) U.S. Cl.
CPC ....... *G08B 13/19608* (2013.01); *H04N 7/181* (2013.01); *G06T 2207/10016* (2013.01); *G06T 2207/30201* (2013.01); *G06T 2207/30241* (2013.01)

(58) Field of Classification Search
CPC ........... G06K 9/00791; G06K 9/00845; G06K 2009/4666; G06K 9/00624; G06K 9/46; G06K 9/52; G06K 9/00805
See application file for complete search history.

(56) References Cited

U.S. PATENT DOCUMENTS

| | | |
|---|---|---|
| 2003/0058337 A1 | 3/2003 | Tanaka et al. |
| 2004/0085196 A1 | 5/2004 | Miller |
| 2004/0189451 A1 | 9/2004 | Zoratti |
| 2005/0248445 A1 | 11/2005 | Matsuoka |
| 2007/0248244 A1 | 10/2007 | Sato |
| 2007/0279438 A1 | 12/2007 | Takakura et al. |
| 2008/0181453 A1* | 7/2008 | Xu .......................... G06T 7/194 382/103 |
| 2009/0303024 A1 | 12/2009 | Asari |
| 2010/0253602 A1 | 10/2010 | Szczerba et al. |
| 2012/0148102 A1 | 6/2012 | Moriguchi et al. |
| 2014/0188365 A1 | 7/2014 | Nagata |
| 2015/0310274 A1* | 10/2015 | Shreve ...................... G06T 7/20 382/103 |

FOREIGN PATENT DOCUMENTS

| | | |
|---|---|---|
| JP | 2007-226351 A | 9/2007 |
| JP | 2007-334631 A | 12/2007 |
| JP | 2009-193135 A | 8/2009 |
| JP | 2009-268005 A | 11/2009 |
| JP | 2013-097480 A | 5/2013 |
| JP | 2013-242728 A | 12/2013 |
| JP | 2014-072598 A | 4/2014 |
| WO | 2004/035352 A1 | 4/2004 |

OTHER PUBLICATIONS

Communication dated Apr. 14, 2020, from the Japanese Patent Office in Application No. 2019-037964.
Notice of Allowance dated May 15, 2019, in related U.S. Appl. No. 16/351,982, 13 pages.
International Search Report for PCT/JP2015/083912 dated Feb. 16, 2016 [PCT/ISA/210].
Written Opinion for PCT/JP2015/083912 dated Feb. 16, 2016 [PCT/ISA/237].
Japanese Office Communication for JP Application No. 2020-131690 dated Apr. 12, 2022 with English Translation.

* cited by examiner

| TARGET OBJECT SPEED | BLIND SPOT SIZE | PREDICTED APPEARANCE TIME | PREDETERMINED TIME |
|---|---|---|---|
| V1 | S1 | T1 | +t1 |
| V2 | S2 | T2 | +t2 |
| V3 | S3 | T3 | +t3 |
| ... | ... | ... | ... |

401

| SHIELDING OBJECT | | BLIND SPOT |
|---|---|---|
| POSITION | SIZE | |
| (X1, Y1) | S1 | (X1', Y1') ~ (X1'', Y1'') |
| (X2, Y2) | S2 | (X2', Y2') ~ (X2'', Y2'') |
| (X3, Y3) | S3 | (X3', Y3') ~ (X3'', Y3'') |
| ... | ... | ... |

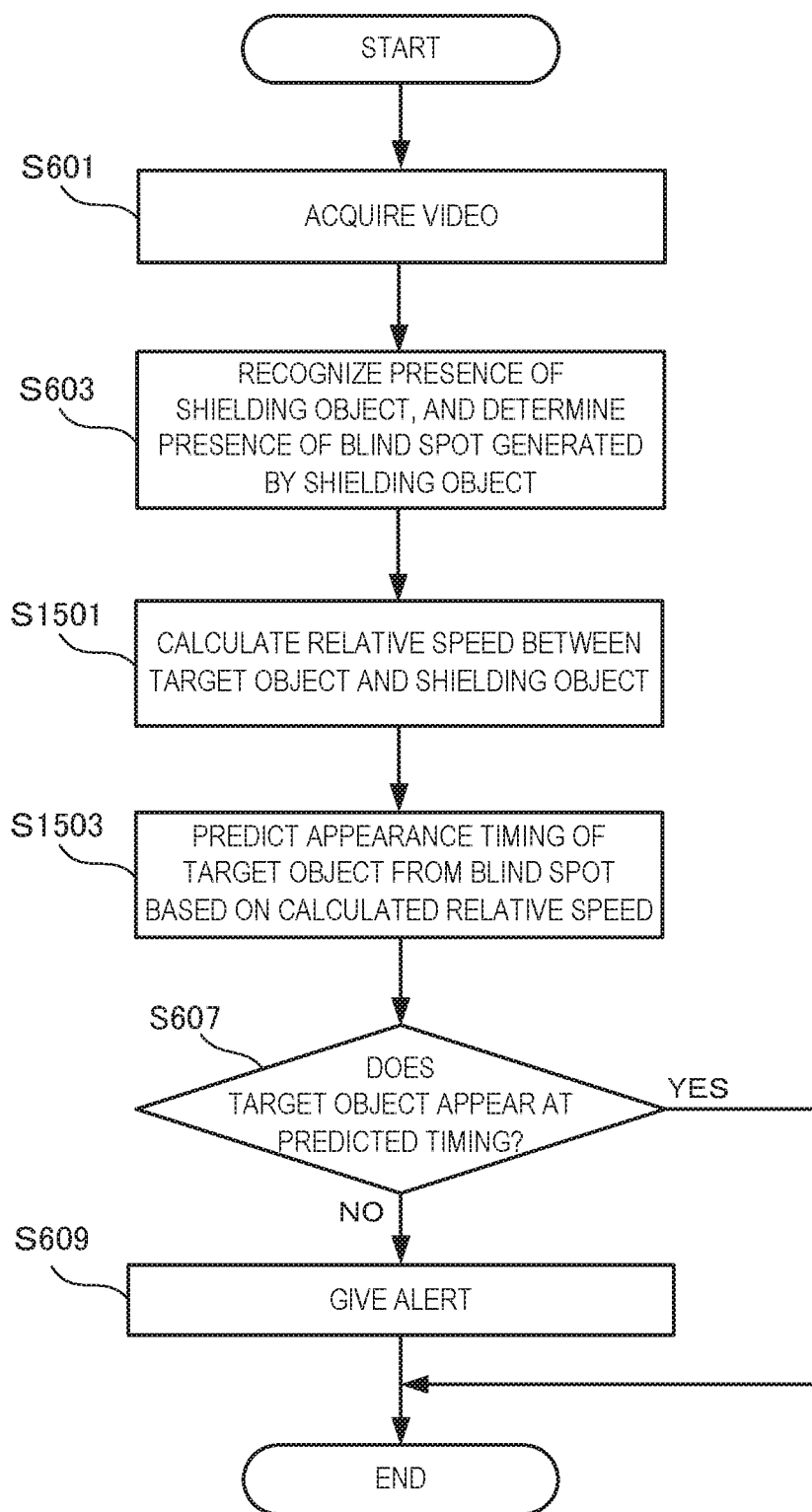
F I G. 15

MONITORING SYSTEM, MONITORING METHOD, AND MONITORING PROGRAM

CROSS REFERENCE TO RELATED APPLICATIONS

This application is a continuation of U.S. application Ser. No. 16/687,048, filed Nov. 18, 2019, which is a continuation of U.S. application Ser. No. 16/352,011, filed Mar. 13, 2019, now U.S. Pat. No. 10,516,855, issued Dec. 24, 2019, which is a continuation of U.S. application Ser. No. 15/559,526, filed Sep. 19, 2017, now U.S. Pat. No. 10,368,035, issued Jul. 30, 2019, which is a National State of International Application No. PCT/JP2015/083912 filed Dec. 2, 2015, claiming priority based on Japanese patent application No. 2015-058279 filed on Mar. 20, 2015, the contents of all of which are incorporated herein by reference in their entirety.

TECHNICAL FIELD

The present invention relates to a monitoring system, a monitoring method, and a monitoring program.

BACKGROUND ART

In the above technical field, patent literature 1 discloses a technique in which if a tracking object is hidden by a shielding object and appears again, the same identification number is added to the tracking object. Patent literature 2 discloses a technique in which if a tracking vehicle is hidden by a shielding object, the predicted position of the tracking vehicle is displayed on a monitor. Furthermore, patent literature 3 discloses a technique of giving an alarm by predicting the risk that an object in a blind spot of a driver runs out.

CITATION LIST

Patent Literature

Patent literature 1: Japanese Patent Laid-Open No. 2007-334631
Patent literature 2: Japanese Patent Laid-Open No. 2009-193135
Patent literature 3: Japanese Patent Laid-Open No. 2013-97480

SUMMARY OF THE INVENTION

Technical Problem

In the techniques described in the above patent literatures, however, it is impossible to discover an abnormality behind a shielding object.

The present invention enables to provide a technique of solving the above-described problem.

Solution to Problem

One aspect of the present invention provides a monitoring system comprising:
a video acquirer that acquires a video;
a detector that detects entering of a target object into a blind spot generated by a shielding object in the video and appearance of the target object from the blind spot; and
a notifier that makes a notification if the target object does not appear from the blind spot even after a first time elapses since entering of the target object into the blind spot.

Another aspect of the present invention provides a monitoring method comprising:
acquiring a video;
detecting entering of a target object into a blind spot generated by a shielding object in the video and appearance of the target object from the blind spot; and
making a notification if the target object does not appear from the blind spot even after a first time elapses since entering of the target object into the blind spot.

Still other aspect of the present invention provides a monitoring program for causing a computer to execute a method, comprising:
acquiring a video;
detecting entering of a target object into a blind spot generated by a shielding object in the video and appearance of the target object from the blind spot; and
making a notification if the target object does not appear from the blind spot even after a first time elapses since entering of the target object into the blind spot.

Advantageous Effects of Invention

According to the present invention, it is possible to discover an abnormality behind a shielding object.

BRIEF DESCRIPTION OF DRAWINGS

FIG. 4B is a table showing the structure of a shielding object table provided in the monitoring system according to the second example embodiment of the present invention;

FIG. 15 is a flowchart illustrating the processing procedure of the monitoring system according to the fifth example embodiment of the present invention.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

A monitoring system 100 according to the first example embodiment of the present invention will be described with reference to FIG. 1. The monitoring system 100 is a system that discovers an abnormality behind a shielding object by using, as a trigger, the fact that a target object entering a blind spot does not appear from the blind spot even after a predetermined time elapses.

Figure 1:
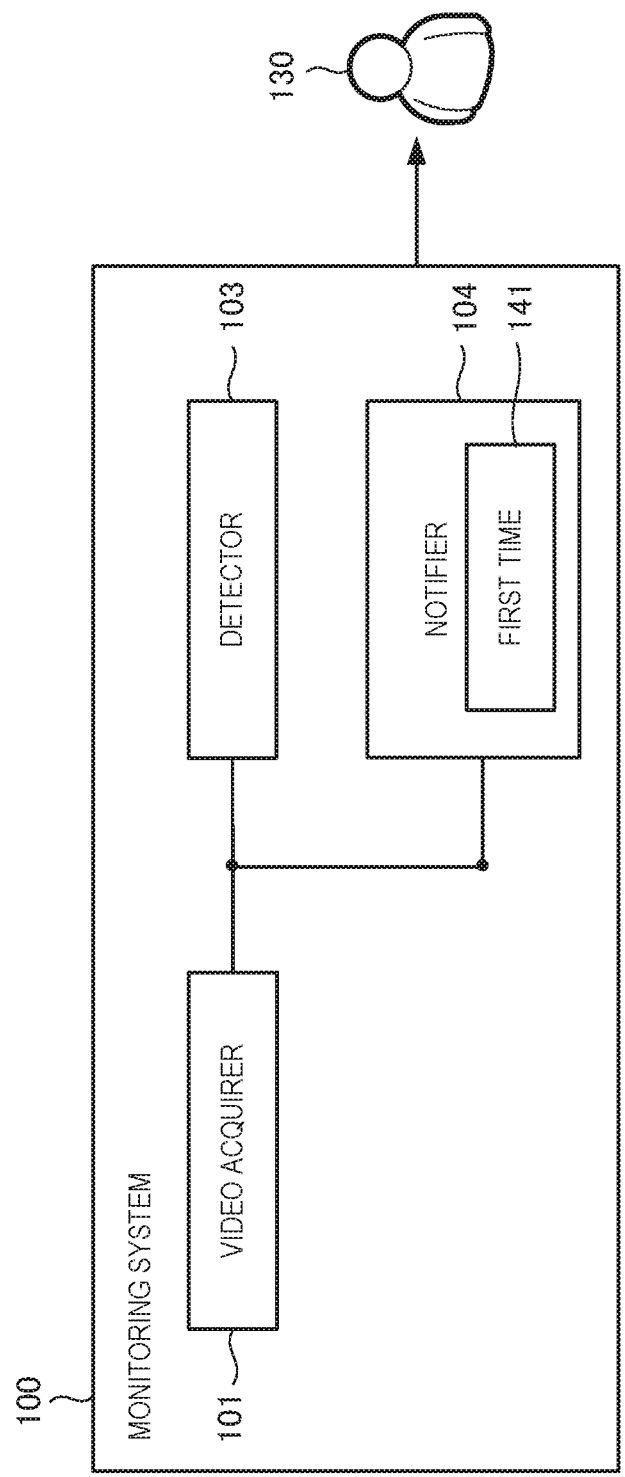
FIG. 1 is a block diagram showing the arrangement of a monitoring system according to the first example embodiment of the present invention.

As shown in FIG. 1, the monitoring system 100 includes a video acquirer 101, a detector 103, and a notifier 104. The notifier 104 has a first time 141. The video acquirer 101 acquires a video.

The detector 103 detects entering of a target object into a blind spot generated by a shielding object in the video and the appearance of the target object from the blind spot. If the target object does not appear from the blind spot even after the first time 141 elapses since entering of the target object into the blind spot, the notifier 104 notifies a monitor 130 or the like of it.

According to this example embodiment, it is possible to discover an abnormality behind the shielding object.

Second Example Embodiment

Figure 2:
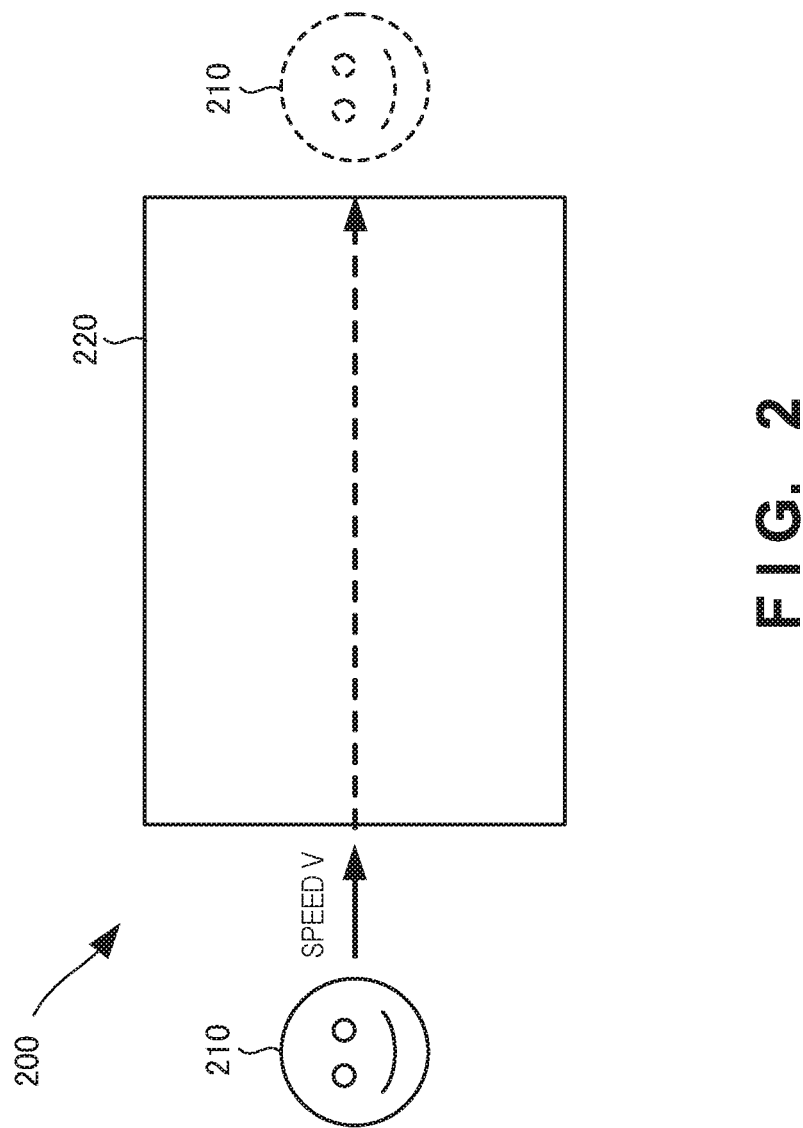
FIG. 2 is a view for explaining an outline of the operation of a monitoring system according to the second example embodiment of the present invention.

A monitoring system according to the second example embodiment of the present invention will be described next with reference to FIGS. 2 to 6. FIG. 2 is a view for explaining an outline of the operation of the monitoring system according to this example embodiment. As shown in FIG. 2, a target object 210 moves at a speed V from left to right in FIG. 2. There exists a shielding object 220 at the moving destination of the target object 210, and the presence of the shielding object 220 generates a blind spot behind the shielding object 220. After that, if the target object 210 enters the blind spot generated by the shielding object 220 and becomes invisible, the target object 210 cannot be tracked.

A monitoring system 200 predicts, based on the speed (V) when the target object 210 enters the blind spot, the timing at which the target object 210 appears again. If the target object 210 does not appear at the predicted timing or even after a predetermined time elapses since the predetermined timing, the monitoring system 200 alerts a monitor or the like.

For example, assume that the predicted appearance timing comes three sec later. In this case, if the target object 210 does not appear again even after a lapse of [3 sec+α sec], it is determined that an abnormality has occurred in the blind spot behind the shielding object 220, and a monitor or the like is alerted. To the contrary, if the target object 210 appears within [3 sec+α sec], the monitoring system 200 determines that no abnormality has occurred behind the shielding object 220, and does not alert the monitor or the like. This can readily discover an event such as a fall of a person or an accident or an abnormality such as a criminal act including a drug deal behind the shielding object 220.

Figure 3:
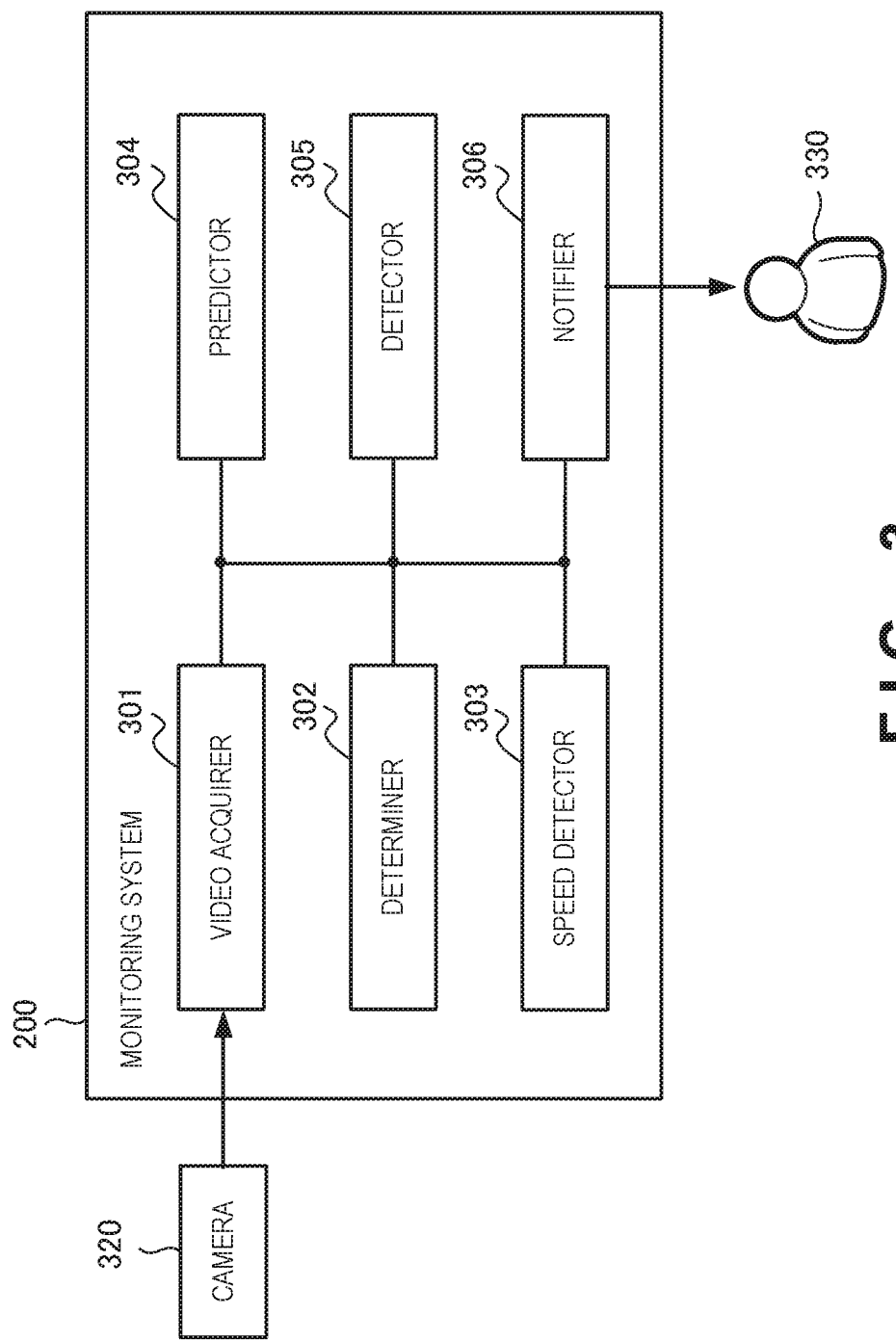
FIG. 3 is a block diagram showing the arrangement of the monitoring system according to the second example embodiment of the present invention.

FIG. 3 is a block diagram showing the arrangement of the monitoring system 200 according to this example embodiment. The monitoring system 200 includes a video acquirer 301, a determiner 302, a speed detector 303, a predictor 304, a detector 305, and a notifier 306.

The video acquirer 301 acquires a video from a camera 320. Note that the number of cameras 320 is not limited to one, and a plurality of cameras 320 may exist. The determiner 302 determines that a blind spot generated by a shielding object exists in the video acquired by the video acquirer 301. The determiner 302 may determine the presence of the blind spot by performing two-dimensional analysis using a video of one camera or three-dimensional analysis using videos of a plurality of cameras. If two-dimensional analysis is performed, the determiner 302 may determine that the blind spot exists in a region occupied by the shielding object in an image.

The speed detector 303 detects an entering speed when the target object enters the blind spot generated by the shielding object. Based on the entering speed of the target object detected by the speed detector 303, the predictor 304 predicts the appearance timing at which the target object appears from the blind spot. The detector 305 detects the appearance of the target object from the blind spot. If the target object does not appear from the blind spot even after a predetermined time elapses since the appearance timing predicted by the predictor 304, the notifier 306 notifies a monitor 330 or the like of it.

Figure 4A:
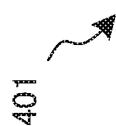
FIG. 4A is a table showing the structure of a prediction table provided in the monitoring system according to the second example embodiment of the present invention.

FIG. 4A is a table showing an example of the structure of a prediction table 401 provided in the monitoring system 200 according to this example embodiment. The prediction table 401 stores predicted appearance time and a predetermined time as an elapsed time since the predicted appearance time in association with each combination of a target object speed and a blind spot size. With respect to the appearance timing of the target object, the predictor 304 may detect the size of the shielding object, and derive the appearance timing from the entering speed of the target object and the detected size of the shielding object. The predictor 304 may specify the appearance timing using the prediction table 401 shown in FIG. 4A.

FIG. 4B is a table showing an example of the structure of a shielding object table 402 provided in the monitoring system 200 according to this example embodiment. The shielding object table 402 stores the position of the blind spot generated by the shielding object in association with the position and size of the shielding object. With respect to the blind spot generated by the shielding object, the monitoring system 200 may detect the size of the shielding object and derive the position of the blind spot based on the detected size. Furthermore, the monitoring system 200 may specify the position of the blind spot using the shielding object table 402 shown in FIG. 4B.

Figure 4C:
FIG. 4C is a table showing the structure of a notification table provided in the monitoring system according to the second example embodiment of the present invention.

FIG. 4C is a table showing an example of the arrangement of a notification table 403 provided in the monitoring system 200 according to this example embodiment. The notification table 403 stores an alert level and a notification destination in association with an appearance delay time. For example, if a delay time is "T4", the alert level is "1" and the notification destination is "monitor". As an alert, for example, the alert level may be changed in accordance with an elapsed time (appearance delay time) since the predicted appearance timing. For example, the alert level may be changed by gradually increasing the volume of an alarm sound, flickering display on a screen viewed by the monitor, or gradually increasing the display.

Figure 5:
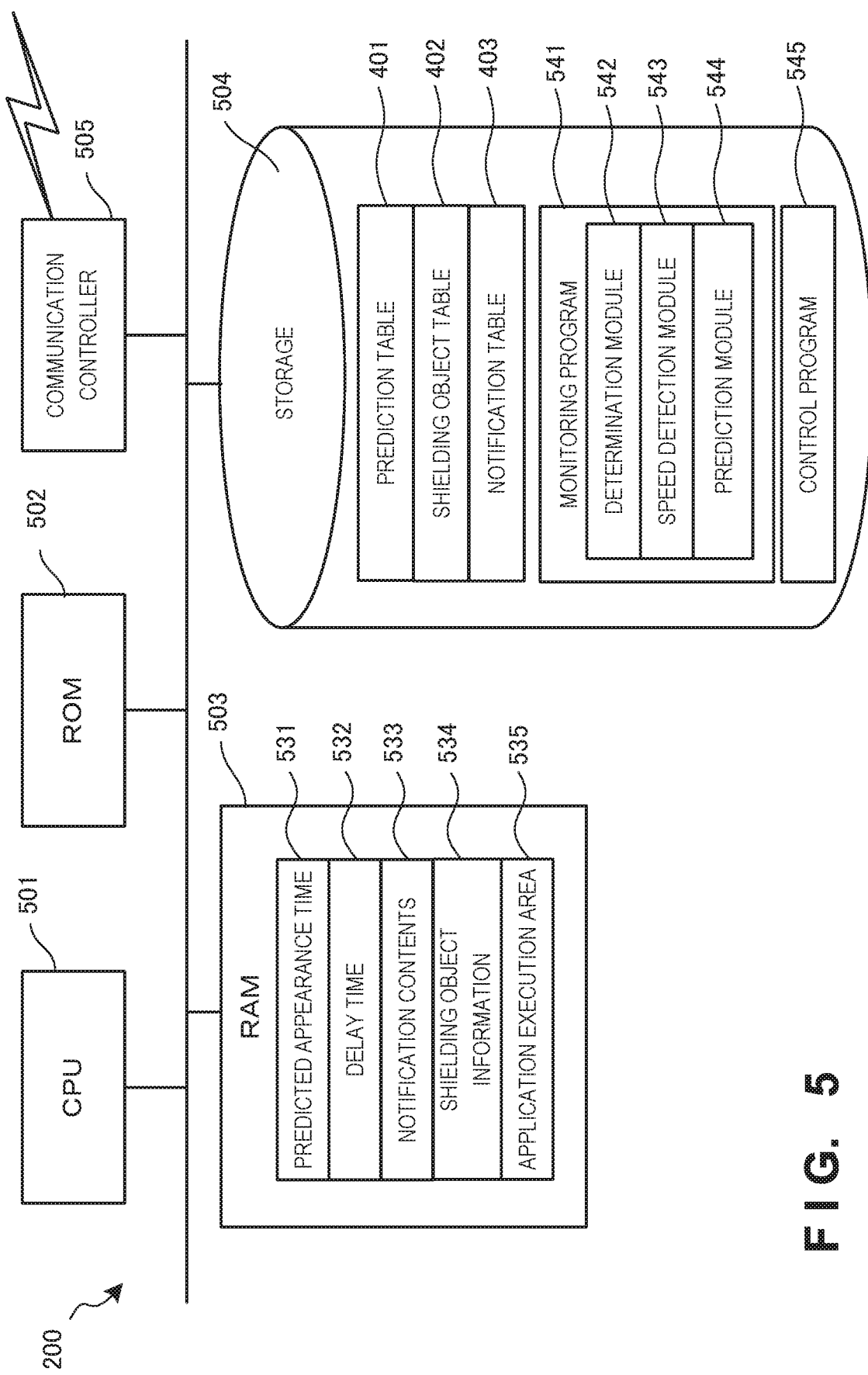
FIG. 5 is a view showing the hardware arrangement of the monitoring system according to the second example embodiment of the present invention.

FIG. 5 is a view showing the hardware arrangement of the monitoring system 200. The monitoring system 200 includes a CPU (Central Processing Unit) 501, a ROM (Read Only Memory) 502, a RAM (Random Access Memory) 503, a storage 504, and a communication controller 505.

The CPU 501 is an arithmetic processing processor, and implements the functional components of the monitoring system 200 by executing a program. Note that the number of CPUs 501 is not limited to one, and a plurality of CPUs or a GPU (Graphics Processing Unit) for image processing may be included. The ROM 502 is a read only memory, and stores programs such as firmware.

The communication controller 505 communicates with another apparatus via a network. The communication controller 505 may include a CPU independent of the CPU 501, and write or read out transmission/reception data in or from the RAM 503.

The RAM 503 is a random access memory used as a temporary storage work area by the CPU 501. An area to store data necessary for implementation of the example embodiment is allocated to the RAM 503. The monitoring system 200 temporarily saves, as the data, predicted appearance time 531, a delay time 532, notification contents 533, and shielding object information 534. The RAM 503 includes an application execution area 535 for executing various application modules.

The storage 504 is a storage device that stores programs and databases necessary for implementation of this example embodiment. The storage 504 stores the prediction table 401, the shielding object table 402, the notification table 403, a monitoring program 541, and a control program 545. The monitoring program 541 stores a determination module 542, a speed detection module 543, and a prediction module 544. These modules 542 to 544 are read out by the CPU 501 into the application execution area 535, and executed. The control program 545 is a program for controlling the whole monitoring system 200. It is desirable to provide a DMAC (Direct Memory Access Controller) for transferring data between the RAM 503 and the storage 504 (not shown).

Note that programs and data which are associated with the general-purpose functions of the monitoring system 200 and other feasible functions are not shown in the RAM 503 or the storage 504 of FIG. 5. The above-described hardware arrangement of the monitoring system 200 is merely an example. The present invention is not limited to this, and various hardware arrangements can be adopted.

Figure 6:
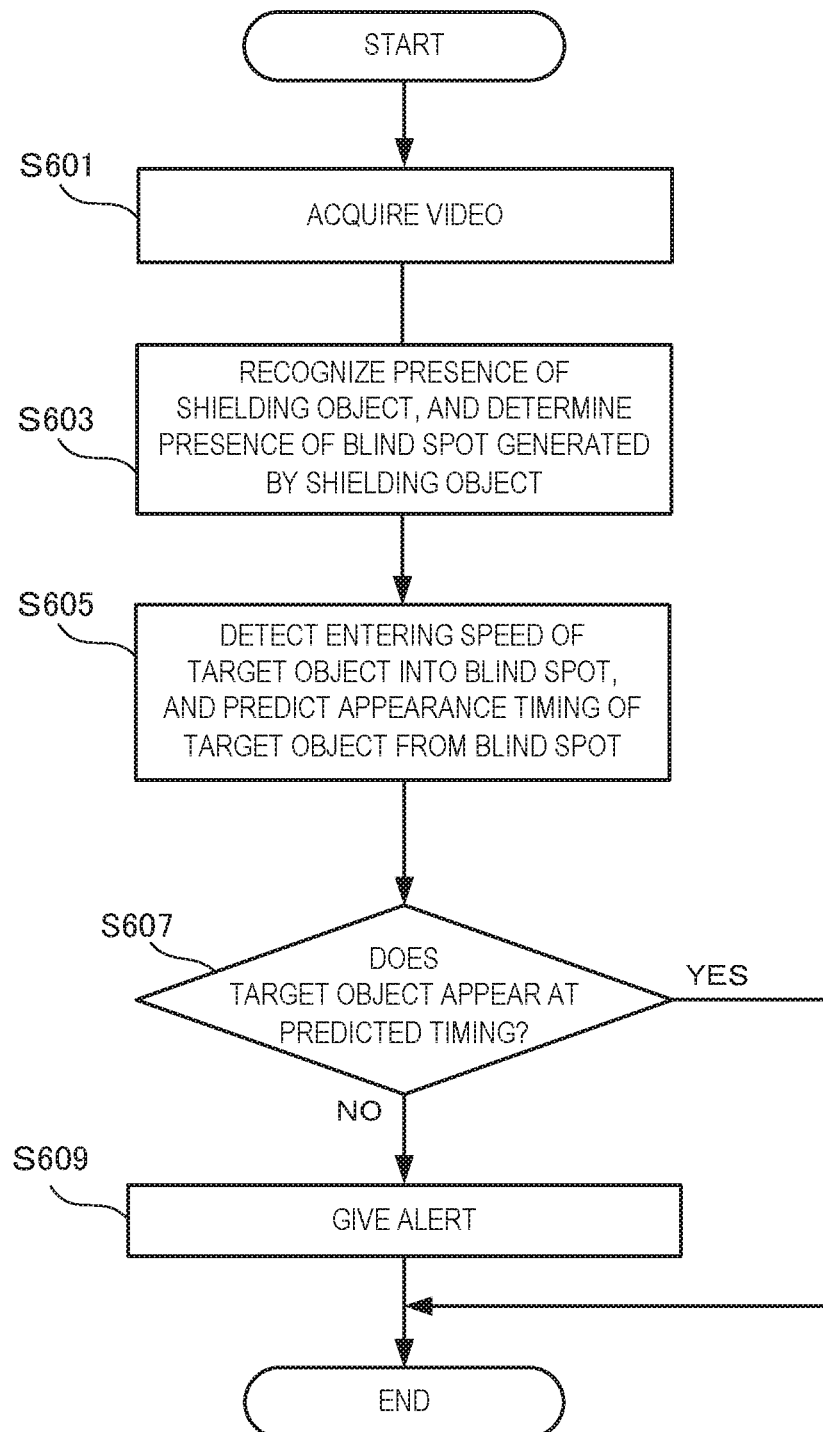
FIG. 6 is a flowchart illustrating the processing procedure of the monitoring system according to the second example embodiment of the present invention.

FIG. 6 is a flowchart for explaining the processing procedure of the monitoring system 200. In step S601, the monitoring system 200 acquires a video from a camera. In step S603, the monitoring system 200 recognizes the presence of a shielding object in the acquired video, and determines the presence of a blind spot generated by the shielding object. In step S605, the monitoring system 200 detects the entering speed of a target object entering the blind spot behind the shielding object, and predicts the appearance timing of the target object from the blind spot. In step S607, the monitoring system 200 determines whether the target object appears from the blind spot at the predicted appearance timing (predicted appearance time) or within a predetermined time since the appearance timing. If the target object does not appear from the blind spot at the predicted appearance timing or within the predetermined time since the appearance timing, the monitoring system 200 gives an alert in step S609.

According to this example embodiment, since the appearance timing of the target object is predicted, it is possible to discover an abnormality such as a fall of a person, an accident, or a criminal act including a drug deal behind the shielding object.

Third Example Embodiment

Figure 7:
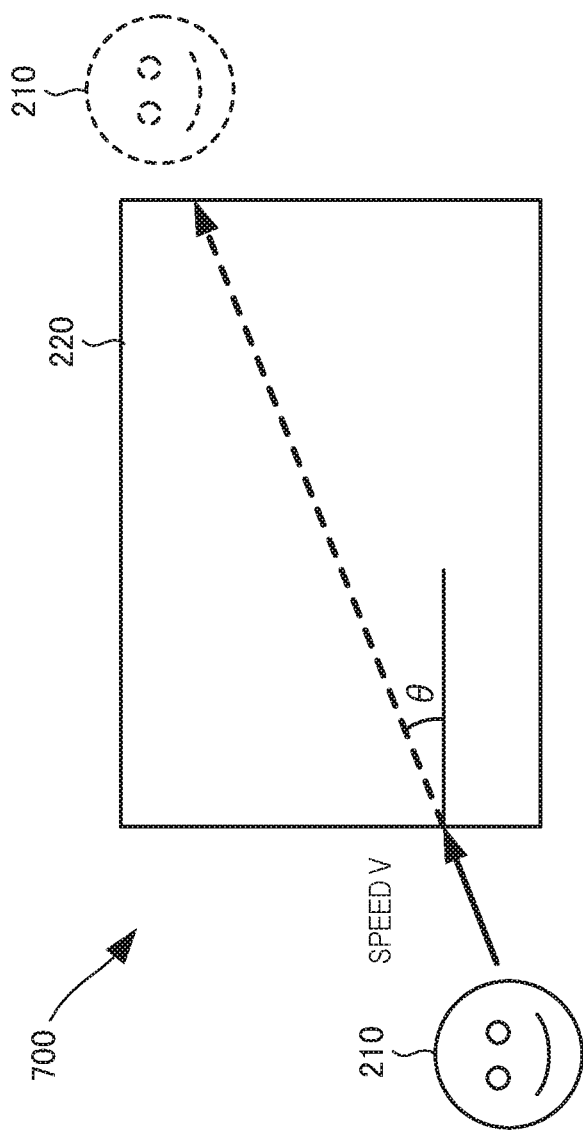
FIG. 7 is a view for explaining an outline of the operation of a monitoring system according to the third example embodiment of the present invention.

A monitoring system 700 according to the third example embodiment of the present invention will be described next with reference to FIGS. 7 to 9. FIG. 7 is a view for explaining an outline of the operation of the monitoring system 700 according to this example embodiment. The monitoring system 700 according to this example embodiment is different from the above-described second example embodiment in that a direction detector is provided. The remaining components and operations are the same as those in the second example embodiment. Hence, the same reference numerals denote the same components and operations, and a detailed description thereof will be omitted.

The monitoring system 700 detects the entering direction of a target object 210 into a blind spot generated by a shielding object 220. Based on the detected entering direction and speed, the appearance timing and appearance position of the target object 210 are predicted.

Figure 8:
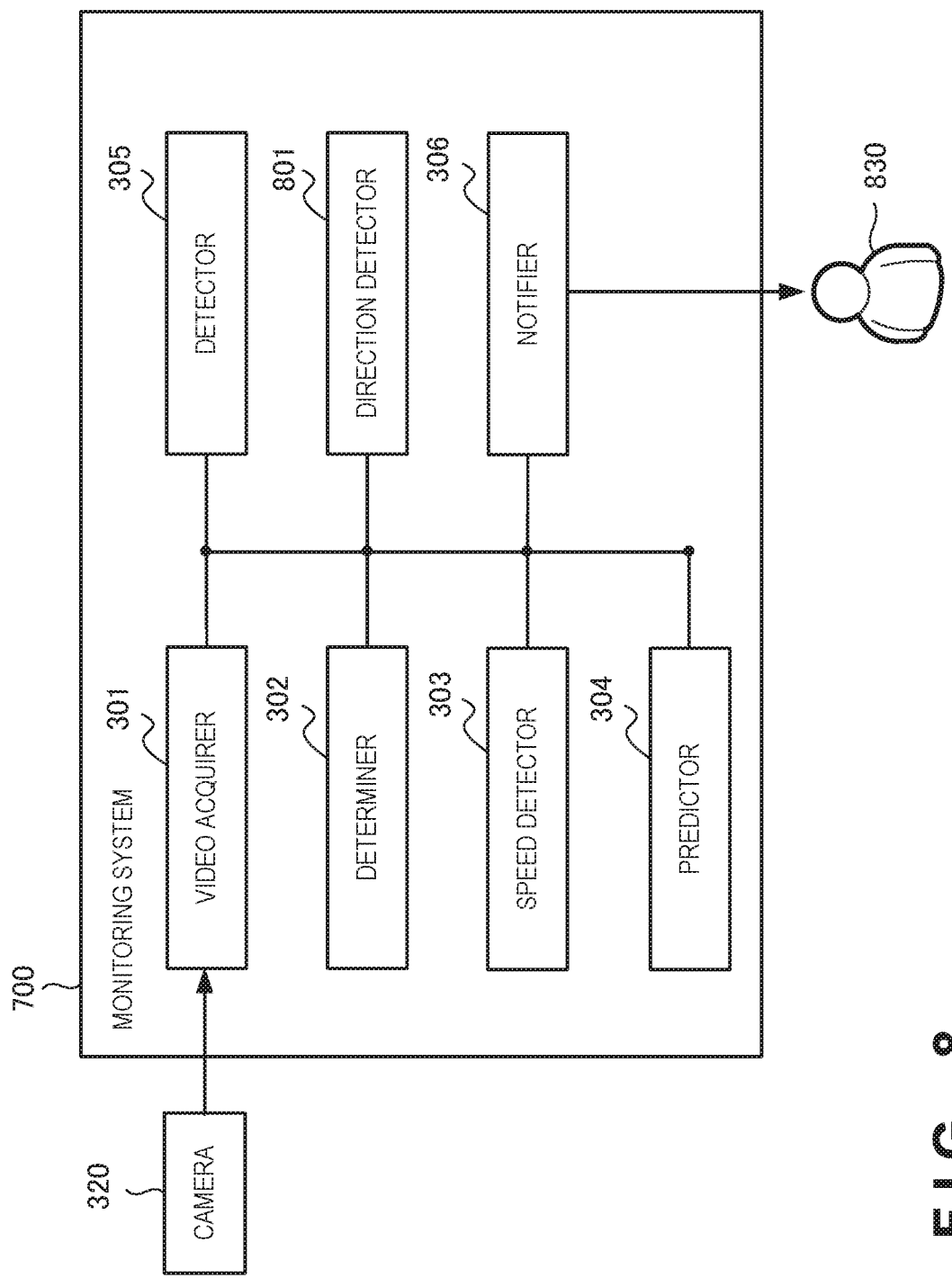
FIG. 8 is a block diagram showing the arrangement of the monitoring system according to the third example embodiment of the present invention.

FIG. 8 is a block diagram showing the arrangement of the monitoring system 700. The monitoring system 700 further includes a direction detector 801. The direction detector 801 detects the entering direction of the target object into the blind spot generated by the shielding object. Based on the entering direction and the entering speed, the monitoring system 700 predicts the appearance position of the target object together with the appearance timing of the target object.

Figure 9:
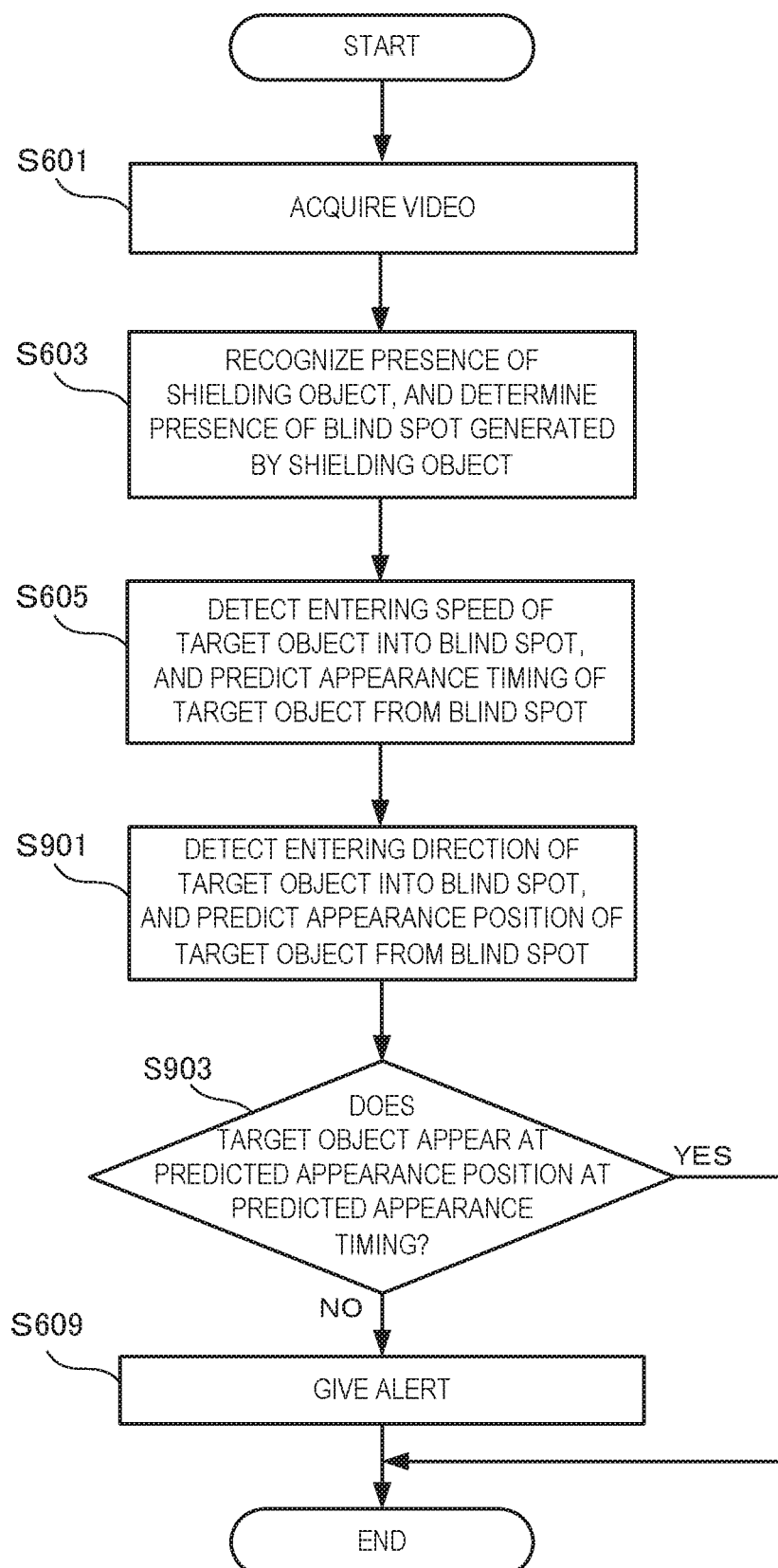
FIG. 9 is a flowchart illustrating the processing procedure of the monitoring system according to the third example embodiment of the present invention.

FIG. 9 is a flowchart for explaining the processing procedure of the monitoring system 700. Note that the same step numbers as those in FIG. 6 denote the same steps, and a description thereof will be omitted. In step S901, the monitoring system 700 further detects the entering direction of the target object into the blind spot, and predicts the appearance position of the target object from the blind spot based on the detected entering direction. In step S903, the monitoring system 700 determines whether the target object appears at the predicted appearance position at the predicted appearance timing.

According to this example embodiment, since the appearance position is predicted by additionally considering the entering direction of the target object into the blind spot generated by the shielding object, it is possible to discover an abnormality such as a fall of a person, an accident, or a criminal act including a drug deal behind the shielding object.

Fourth Example Embodiment

Figure 10:
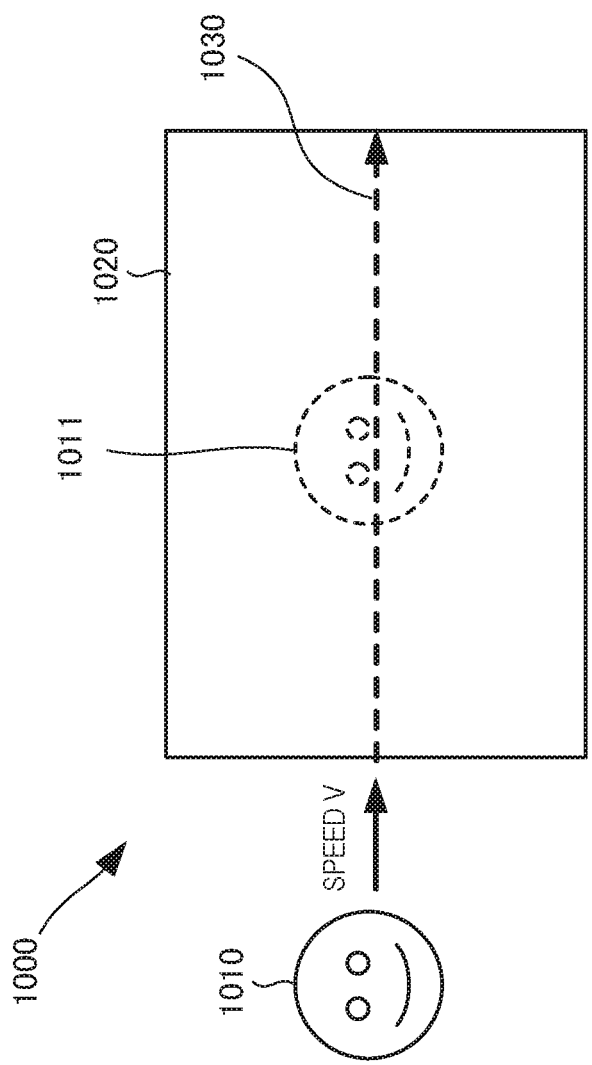
FIG. 10 is a view for explaining an outline of the operation of a monitoring system according to the fourth example embodiment of the present invention.

A monitoring system 1000 according to the fourth example embodiment of the present invention will be described next with reference to FIGS. 10 to 12. FIG. 10 is a view for explaining an outline of the operation of the monitoring system 1000 according to this example embodiment. The monitoring system 1000 according to this example embodiment is different from the above-described third example embodiment in that a video generator is provided. The remaining components and operations are the same as those in the third example embodiment. Hence, the same reference numerals denote the same components and operations, and a detailed description thereof will be omitted.

If a target object 1010 enters a blind spot generated by a shielding object 1020, the monitoring system 1000 displays, based on an entering speed at which the target object 1010 enters the blind spot, a predicted position mark 1011 indicating a predicted position at which the target object 1010 is located in the blind spot generated by the shielding object 1020. Furthermore, the monitoring system 1000 displays a predicted moving trajectory 1030 together with the predicted position mark 1011. The monitoring system 1000 may display the predicted position mark 1011 and the predicted moving trajectory 1030 in consideration of an entering direction in addition to the entering speed of the target object 1010 into the blind spot. The monitoring system 1000 may also predict the appearance position of the target object 1010 entering the blind spot from the blind spot, and display the predicted appearance position. For example, the monitoring system 1000 may display the appearance position like a target object 210 indicated by dotted lines in FIG. 2 or a target object 210 indicated by dotted lines in FIG. 7 (or a target object 1310 indicated by dotted lines in FIG. 13 to be described later), or display the appearance position as a region.

Figure 11:
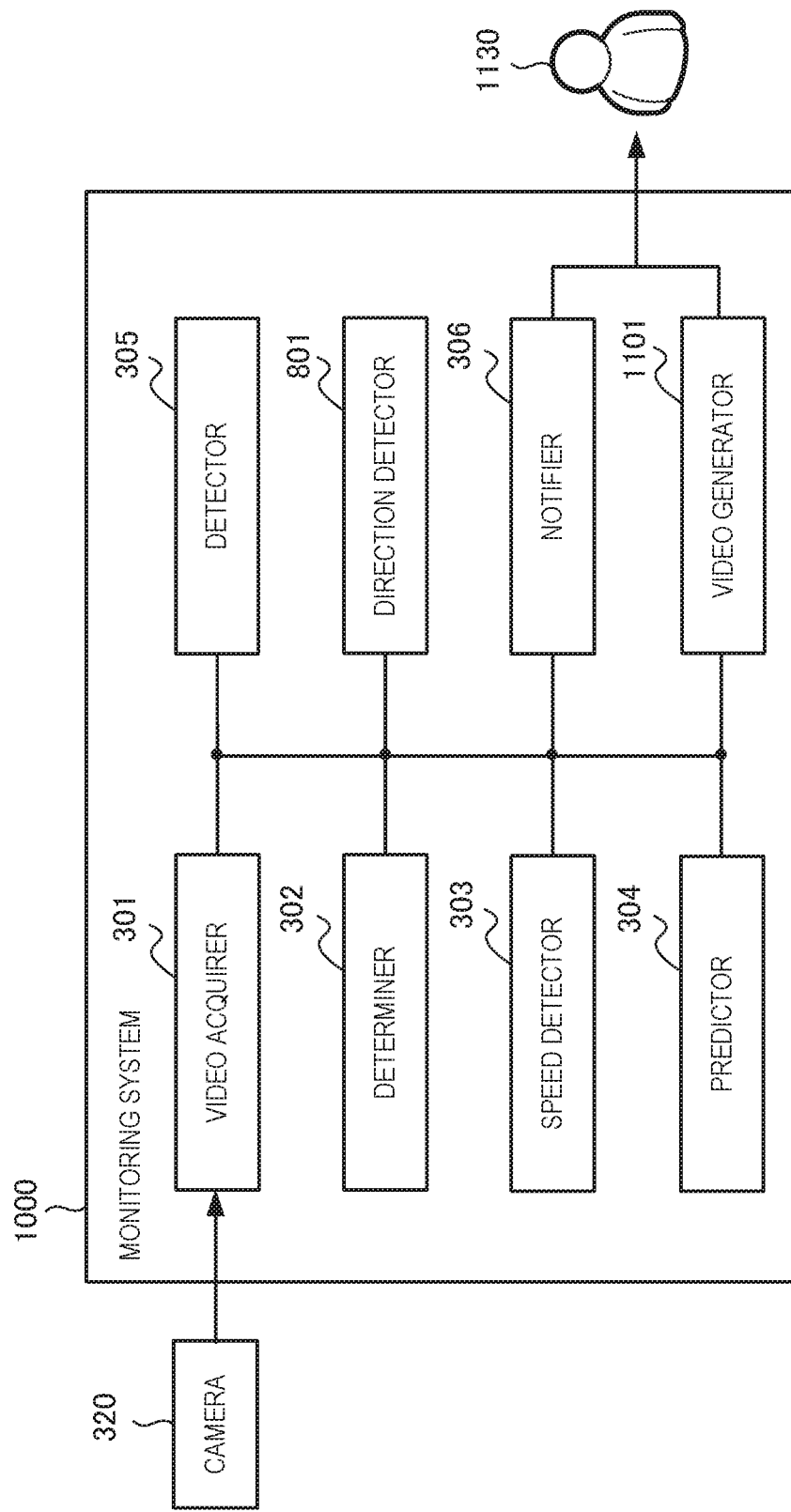
FIG. 11 is a block diagram showing the arrangement of the monitoring system according to the fourth example embodiment of the present invention.

FIG. 11 is a block diagram showing the arrangement of the monitoring system 1000. The monitoring system 1000 further includes a video generator 1101. The video generator 1101 generates a video by superimposing, on a video acquired by a video acquirer 301, the trajectory of the target object generated based on prediction by a predictor 304. The video generator 1101 shows the generated video to a monitor 1130 or the like.

Figure 12:
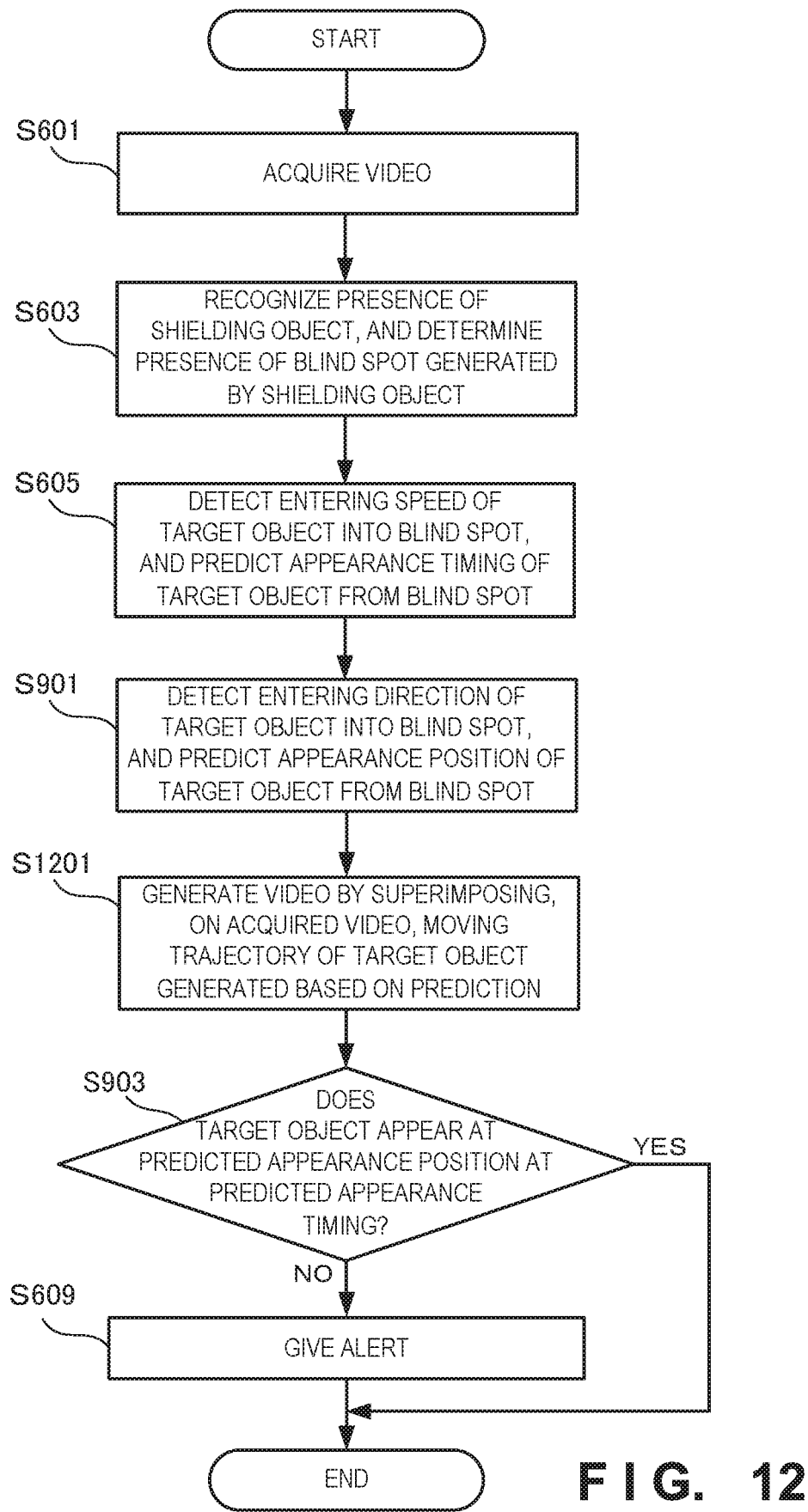
FIG. 12 is a flowchart illustrating the processing procedure of the monitoring system according to the fourth example embodiment of the present invention.

FIG. 12 is a flowchart for explaining the processing procedure of the monitoring system 1000. Note that the same step numbers as those in FIG. 6 denote the same steps, and a description thereof will be omitted. In step S1201, the monitoring system 1000 generates a video by superimposing, on an acquired video, the moving trajectory of the target object generated based on prediction. The monitoring system 1000 shows the generated superimposed video to the monitor 1130 or the like.

According to this example embodiment, since the predicted position mark and the predicted moving trajectory are displayed, it is possible to discover an abnormality such as a fall of a person, an accident, or a criminal act including a drug deal behind the shielding object, and the monitor can visually recognize the appearance timing of the target object.

Fifth Example Embodiment

Figure 13:
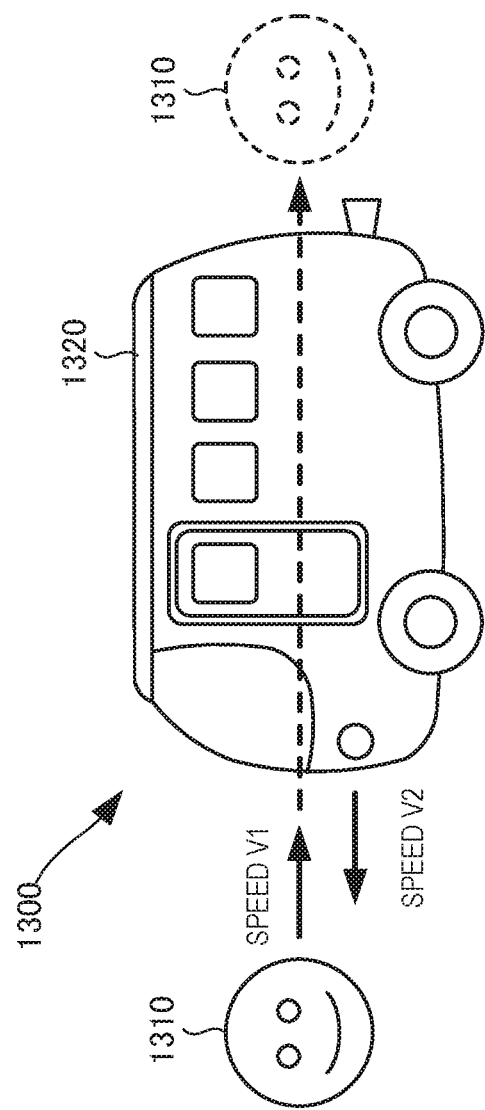
FIG. 13 is a view for explaining an outline of the operation of a monitoring system according to the fifth example embodiment of the present invention.

A monitoring system 1300 according to the fifth example embodiment of the present invention will be described next with reference to FIGS. 13 to 15. FIG. 13 is a view for explaining an outline of the operation of the monitoring system 1300 according to this example embodiment. The monitoring system 1300 according to this example embodiment is different from the above-described third example embodiment in that a predictor considers a relative speed. The remaining components and operations are the same as those in the second example embodiment. Hence, the same reference numerals denote the same components and operations, and a detailed description thereof will be omitted.

FIG. 13 is a view for explaining an outline of the operation of the monitoring system 1300 while a target object 1310 and a shielding object 1320 move. The target object 1310 moves at a speed V1 from left to right in FIG. 13. A vehicle such as a bus serving as the shielding object 1320 moves at a speed V2 from right to left in FIG. 13. In this case, the monitoring system 1300 predicts the appearance timing of the target object 1310 based on the relative speed between the target object 1310 and the shielding object 1320.

Figure 14:
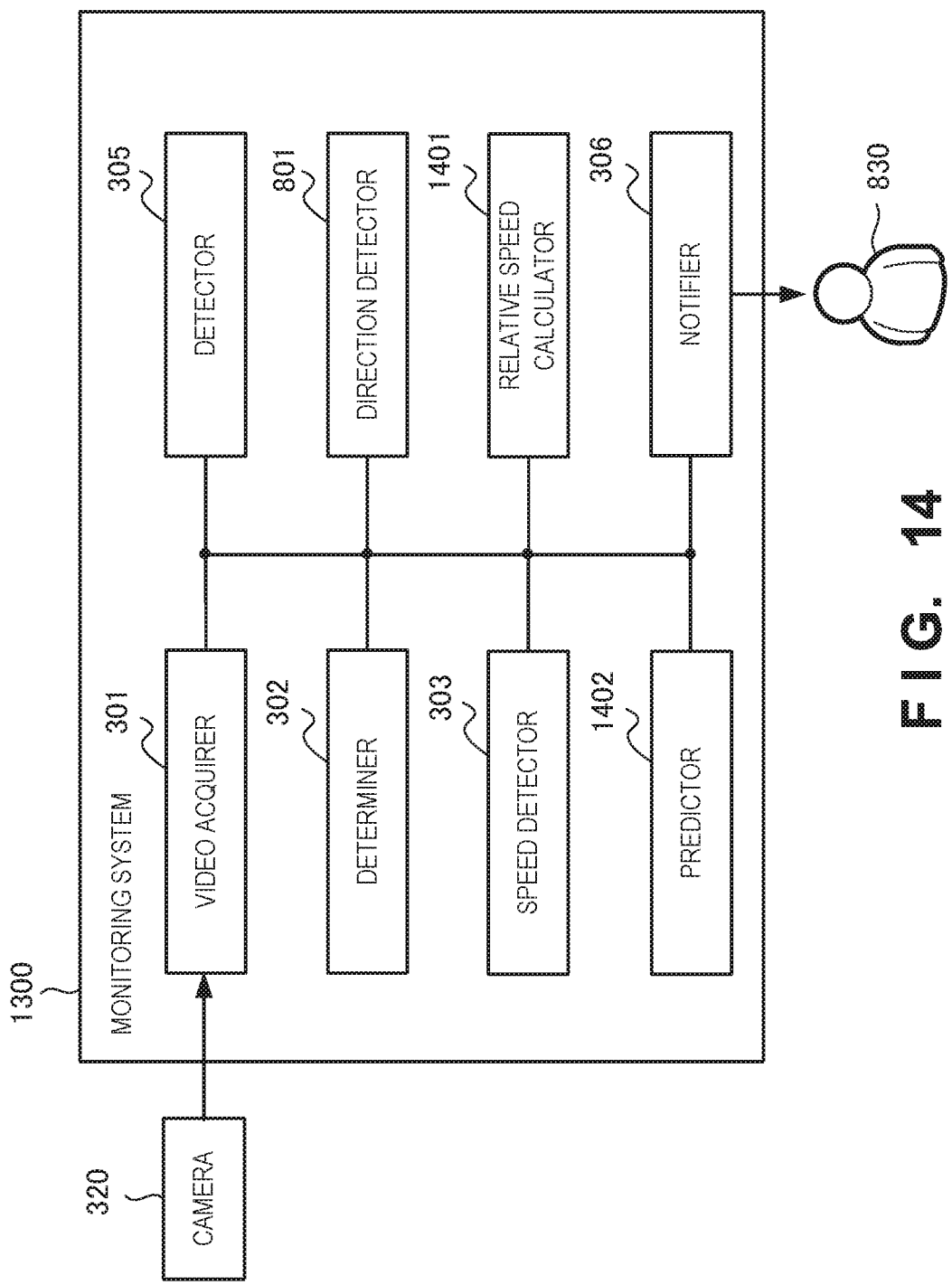
FIG. 14 is a block diagram showing the arrangement of the monitoring system according to the fifth example embodiment of the present invention.

FIG. 14 is a block diagram showing the arrangement of the monitoring system 1300. The monitoring system 1300 includes a relative speed calculator 1401 and a predictor 1402. The relative speed calculator 1401 calculates the relative speed between the moving target object 1310 and the moving shielding object 1320. The predictor 1402 predicts the appearance timing of the target object 1310 based on the relative speed calculated by the relative speed calculator 1401.

FIG. 15 is a flowchart for explaining the processing procedure of the monitoring system 1300. Note that the same step numbers as those in FIG. 6 denote the same steps, and a description thereof will be omitted. In step S1501, the monitoring system 1300 calculates the relative speed between the moving target object 1310 and the moving shielding object 1320. In step S1503, the monitoring system 1300 predicts the appearance timing of the target object 1310 from the blind spot based on the calculated relative speed.

According to this example embodiment, since prediction is performed in consideration of the relative speed, it is possible to discover an abnormality such as a fall of a person, an accident, or a criminal act including a drug deal behind the shielding object.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

The invention claimed is:

1. A monitoring system comprising:
   at least one memory storing instructions; and
   at least one processor coupled to the at least one memory and configured to execute the instructions to:
   acquire a video by a camera;
   detect a shielding object in the acquired video;
   determine a presence of a blind spot generated by the shielding object, based on a position and a size of the shielding object, the blind spot being an area hidden from the camera behind the shielding object;
   predict an appearance area, from the blind spot, of a target object fully hidden from the camera in the blind spot by the shielding object; and
   cause a display device to display the acquired video and the predicted appearance area.

2. The monitoring system according to claim 1, wherein the at least one processor is further configured to execute instructions to:
   detect an entering of the target object into the blind spot.

3. The monitoring system according to claim 1, wherein the at least one processor is further configured to execute instructions to:
   cause the display device to display, on the shielding object, a mark indicating both of a position and a path of the target object.

4. The monitoring system according to claim 1, wherein the at least one processor is further configured to execute instructions to:
   detect an entering direction of the target object into the blind spot; and
   estimate at least one of a position and a path of the target object based on the entering direction.

5. The monitoring system according to claim 1, wherein the at least one processor is further configured to execute instructions to:
   detect an entering speed of the target object entering the blind spot; and
   estimate at least one of a position and a path of the target object in the blind spot based on the entering speed.

6. A monitoring method for monitoring a target object, comprising:
   acquiring a video by a camera;
   detecting a shielding object in the acquired video;
   determine a presence of a blind spot generated by the shielding object, based on a position and a size of the shielding object, the blind spot being an area hidden from the camera behind the shielding object;
   predicting an appearance area, from the blind spot, of a target object fully hidden from the camera in the blind spot by the shielding object; and
   causing a display device to display the acquired video and the predicted appearance area.

7. A non-transitory computer readable medium storing a monitoring program for executing a monitoring method for monitoring a target object, the monitoring method comprising:
   acquiring a video by a camera;
   detecting a shielding object in the acquired video;
   determining a presence of a blind spot generated by the shielding object, based on a position and a size of the shielding object, the blind spot being an area hidden from the camera behind the shielding object;
   predicting an appearance area, from the blind spot, of a target object fully hidden from the camera in the blind spot by the shielding object; and
   causing a display device to display the acquired video and the predicted appearance area.

8. The monitoring system according to claim 1, wherein the shielding object is larger than the target object.

9. The monitoring system according to claim 1, wherein the at least one processor is further configured to execute instructions to determine a position of the blind spot, the position of the blind spot being defined as a plurality of coordinates defining corners of a space.

* * * * *